United States Patent
Ikegami

(10) Patent No.: US 11,293,830 B2
(45) Date of Patent: Apr. 5, 2022

(54) INSPECTION APPARATUS AND INSPECTION METHOD FOR INSPECTING WHETHER OR NOT THERE IS LEAKAGE OF THREE-WAY VALVE DEVICE

(71) Applicant: SHINWA CONTROLS CO., LTD, Kawasaki (JP)

(72) Inventor: Hirotaka Ikegami, Kawasaki (JP)

(73) Assignee: Shinwa Controls Co., Ltd, Kawasaki (JP)

( * ) Notice: Subject to any disclaimer, the term of this patent is extended or adjusted under 35 U.S.C. 154(b) by 98 days.

(21) Appl. No.: 16/979,661

(22) PCT Filed: Mar. 18, 2019

(86) PCT No.: PCT/JP2019/011182
§ 371 (c)(1),
(2) Date: Sep. 10, 2020

(87) PCT Pub. No.: WO2019/181853
PCT Pub. Date: Sep. 26, 2019

(65) Prior Publication Data
US 2021/0025778 A1 Jan. 28, 2021

(30) Foreign Application Priority Data
Mar. 19, 2018 (JP) .............................. JP2018-050741

(51) Int. Cl.
*G01M 3/22* (2006.01)
(52) U.S. Cl.
CPC .................... *G01M 3/224* (2013.01)
(58) Field of Classification Search
CPC .................................................. G01M 3/224
See application file for complete search history.

(56) References Cited

U.S. PATENT DOCUMENTS

| 4,682,495 A * | 7/1987 | McNeely ............ F16K 37/0091 |
| | | 116/277 |
| 2004/0129054 A1* | 7/2004 | Hyme ................. F16K 37/0091 |
| | | 73/1.72 |

(Continued)

FOREIGN PATENT DOCUMENTS

| JP | H06-265435 A1 | 9/1994 |
| JP | 2010-185887 A1 | 8/2010 |

(Continued)

OTHER PUBLICATIONS

International Search Report and Written Opinion (Application No. PCT/JP2018/011182) dated Jun. 4, 2018.

*Primary Examiner* — Paul M. West
*Assistant Examiner* — Mark A Shabman
(74) *Attorney, Agent, or Firm* — Burr & Brown, PLLC

(57) ABSTRACT

The present invention includes: an inspection table configured to support a three-way valve device in such a state that a first opening and a second opening are sealed by a sealing member; a communication hole provided through the inspection table and configured to hermetically communicate with a third opening in a state wherein the three-way valve device is supported by the inspection table; an enclosure configured to cover the three-way valve device to form a sealed space except for the communication part; a helium-gas supply path for supplying a helium gas into the three-way valve device via the communication part and the third opening; a leak tester device configured to determine whether or not there is a leakage of the helium gas into the sealed space; and a helium-gas suction discharge path for suctioning and discharging the helium gas supplied via the third opening and the communication part.

9 Claims, 14 Drawing Sheets

(56) References Cited

U.S. PATENT DOCUMENTS

| | | | |
|---|---|---|---|
| 2011/0113861 A1* | 5/2011 | Maehira | G01M 3/229 73/40.7 |
| 2016/0116365 A1* | 4/2016 | Luedolph | G01M 3/202 73/40.7 |
| 2017/0321814 A1* | 11/2017 | Aoki | F16K 5/0278 |
| 2018/0328501 A1 | 11/2018 | Hiraoka | |
| 2019/0195373 A1 | 6/2019 | Hiraoka | |
| 2019/0302045 A1 | 10/2019 | Uematsu et al. | |
| 2020/0109999 A1* | 4/2020 | Kira | G01M 13/00 |

FOREIGN PATENT DOCUMENTS

| | | |
|---|---|---|
| JP | 2015-135246 A1 | 7/2015 |
| JP | 6104443 B1 | 3/2017 |
| WO | 2018/003977 A1 | 1/2018 |

\* cited by examiner

INSPECTION APPARATUS AND INSPECTION METHOD FOR INSPECTING WHETHER OR NOT THERE IS LEAKAGE OF THREE-WAY VALVE DEVICE

TECHNICAL FIELD

The present invention pertains to an inspection apparatus for inspecting whether or not there is a leakage of a three-way valve device. In addition, the present invention pertains to an inspection method for inspecting whether or not there is a leakage of a three-way valve device.

BACKGROUND ART

Various types of three-way valve devices have been used for a lot of applications. For example, in JP 6104443 B obtained by the applicant, a type of three-way valve device has been disclosed, which is capable of accurately controlling a mixing ratio of two kinds of fluids.

FIG. 11 is an external perspective view of the three-way valve device, FIG. 12 is a longitudinal section view of the three-way valve device, and FIG. 13 is an exploded perspective view of the three-way valve device.

As shown in FIG. 11, the three-way valve device 1 consists of: a valve part 2 arranged in a lower area, an actuator part 3 arranged in a higher area, a sealing part 4 and a coupling part 5 arranged between the valve part 2 and the actuator part 3.

As shown in FIGS. 12 and 13, the valve part 2 includes a valve body 6, which is made of a metal such as SUS and formed into a substantially rectangular parallelepiped.

On the left side of the valve body 6, there are opened: a first opening 7 into which a first fluid (for example, a lower temperature fluid) flows; and a first valve port 9 which has a rectangular cross section and communicates with a cylindrical valve seat 8.

Furthermore, on the left side of the valve body 6, a first flange member 10 for connecting a pipe, which is configured to cause the first fluid (for example, the lower temperature fluid) to flow into, is attached by means of four hexagon socket head bolts 11. The first flange member 10 is made of a metal such as SUS, similarly to the valve body 6.

The first flange member 10 has: a flange part 12 formed into a rectangular shape, which is the same as a lateral face shape of the valve body 6; an insertion part 13 projecting from an inside surface of the flange part 12 and having a thinner-walled cylindrical shape; and a pipe connection part 13 projecting from an outside surface of the flange part 12 and having a thicker-walled substantially cylindrical shape.

On an outside inner-peripheral edge of the first opening 7 of the valve body 6, there is provided a chamfer 16 for disposing an O-ring 15 between the valve body 6 and the flange part 12 of the first flange member 10.

On the other hand, on the right side of the valve body 6, there are opened: a second opening 17 into which a second fluid (for example, a higher temperature fluid) flows; and a second valve port 18 which has a rectangular cross section and communicates with a cylindrical valve seat 8.

Furthermore, on the right side of the valve body 6, a second flange member 19 for connecting a pipe, which is configured to cause the second fluid (for example, the higher temperature fluid) to flow into, is attached by means of four hexagon socket head bolts 20. The second flange member 19 is made of a metal such as SUS, similarly to the first flange member 10.

The second flange member 19 has: a flange part 21 formed into a rectangular shape, which is the same as a lateral face shape of the valve body 6; an insertion part 22 projecting from an inside surface of the flange part 21 and having a thinner-walled cylindrical shape; and a pipe connection part 23 projecting from an outside surface of the flange part 21 and having a thicker-walled substantially cylindrical shape.

On an outside inner-peripheral edge of the second opening 17 of the valve body 6, there is provided a chamfer 25 for disposing an O-ring 24 between the valve body 6 and the flange part 21 of the second flange member 19.

In addition, on the lower side of the valve body 6, there is opened a third opening 26 from which a third fluid (for example, a temperature controlled fluid) flows out, the third fluid being formed by mixing the first fluid (for example, the lower temperature fluid) and the second fluid (for example, the higher temperature fluid).

Furthermore, on the lower side of the valve body 6, a third flange member 27 for connecting a pipe, which is configured to cause the third fluid (for example, the temperature controlled fluid) to flow out, is attached by means of four hexagon socket head bolts 28. The third flange member 27 is made of a metal such as SUS, similarly to the first and second flange members 10, 19.

The third flange member 27 has: a flange part 29 formed into a rectangular shape as seen in plan view, which is smaller than a lower face shape of the valve body 6; an insertion part 30 projecting from an upper surface of the flange part 29 and having a thinner-walled cylindrical shape; and a pipe connection part 31 projecting from a lower surface of the flange part 21 and having a thicker-walled substantially cylindrical shape.

On a lower inner-peripheral edge of the third opening 26 of the valve body 6, there is provided a chamfer 33 for disposing an O-ring 32 between the valve body 6 and the flange part 29 of the third flange member 27.

Then, at the center of the valve body 6, there is provided the cylindrical valve seat 8, which corresponds to an outer shape of a valve shaft 34 explained hereinafter. The valve shaft 34 is also made of a metal such as SUS.

FIG. 14 is a perspective view of the valve shaft 34. As shown in FIG. 14, the outer shape of the valve shaft 34 is generally substantially a cylindrical shape. The valve shaft 34 is roughly divided into: a valve part 35 serving as a valve, an upper and lower shaft supporting parts 36, 37 provided at respective positions higher and lower than the valve part 35 for supporting the valve shaft 34 in a rotatable manner, a sealing part 38 provided at a position higher than the upper shaft supporting part 36, and a coupling part 40 provided at a position higher than the sealing part 38 via a tapered part 39. Each of the upper shaft supporting part 36 and the lower shaft supporting part 37 is formed into a cylindrical shape, whose diameter is the same with each other and smaller than that of the valve part 35.

The lower shaft supporting part 37 is supported via a bearing 41 in a rotatable manner, at a lower end portion of the valve seat 8 of the valve body 6. At the lower end portion of the valve seat 8, there is provided an annular supporting part 42, which projects inwardly and supports the bearing 41.

The bearing 41, the supporting part 42 and the insertion part 30 of the third flange member 27 are set to have the same inner diameter. Thus, the third fluid passing through the valve part 35 can flow out from the pipe connection part 31 of the third flange member 27 with receiving little resistance.

On the other hand, a thrust washer 43 is fitted on the upper shaft supporting part 36, which reduces a load of the valve shaft 34 pressed by a sealing housing 53 explained hereinafter.

As shown in FIG. 12, the sealing part 4 serves to seal the valve shaft 34 in a liquid-tight manner. The sealing part 4 has a sealing housing 53, which is formed into a cylindrical shape and has an insertion hole 52 for inserting the valve shaft 34. The sealing housing 53 is also made of a metal such as SUS.

The sealing housing 53 is inserted and fixed in a cylindrical recess 54 provided on an upper end surface of the valve body 6 under a condition wherein a sealant is applied thereon, or is attached to the valve body 6 in a hermetically sealed manner by using screwing or the like.

Two O-rings 55 and 56 for sealing the valve shaft 34 are respectively arranged at upper and lower positions on an inner peripheral surface of the sealing housing 53. As the sealing member 55, 56, for example, an O-ring made of hydrogenated acrylonitrile-butadiene rubber (H-NBR) being excellent in heat resistance, oil resistance, and weather resistance is used. The sealing housing 53 is mounted with aligned by a parallel pin 57 in the recess 54 of the valve body 6.

The coupling part 5 is arranged between the valve body 6 in which the sealing part 4 is built and the actuator part 3. The coupling part 5 functions to connect the valve shaft 34 and a rotary shaft 58 of the actuator part 3 configured to rotate the valve shaft 34. The coupling part 5 consists of: a spacer member 59 arranged between the sealing part 4 and the actuator part 3, an adapter plate 60 fixed to an upper portion of the spacer member 59, and a coupling member 62 accommodated in an internal space 61 of the spacer member 59 and the adapter plate 60 for connecting the valve shaft 34 and the rotary shaft 58.

As a prior art document, JP 6104443 B has been disclosed, which was already referred to in the specification.

SUMMARY OF INVENTION

Technical Problem

The above mentioned three-way valve device 1 for controlling flow rates has the first opening 7, the second opening 17 and the third opening 26, and thus is an example of a three-way valve. Then, the three-way valve device 1 for controlling flow rates is provided with the three O-rings 15, 24, 32 correspondingly to the respective openings in order to connect the respective constituent members to each other in a liquid-tight manner. In addition, the three-way valve device 1 for controlling flow rates is provided with the two O-rings 55, 56 in order to seal the valve shaft 34 in a liquid-tight manner.

If these O-rings 15, 24, 32, 55, 56 are not able to maintain their sufficient functions, the three-way valve device 1 for controlling flow rates may cause a so-called a leakage.

In addition, besides the O-rings 15, 24, 32, 55, 56, if there is any defect (including an excessive dimensional error) in the constituent members, the three-way valve device 1 for controlling flow rates may cause a leakage.

The applicant of the present application is a manufacturer of such a three-way valve device. Under the background as described above, all the three-way valve devices after manufactured are inspected for a leakage.

Specifically, in order to inspect whether or not there is a leakage in the three-way valve device, two openings of the three-way valve device are sealed, and a helium gas is supplied into the three-way valve device from the other one opening.

In details, the three-way valve device is covered by an enclosure to form a sealed space except for one unsealed opening, the gas in the enclosure is sucked, and then it is inspected by a tester (for example, MSE-2400: manufactured by Shimadzu Corporation) whether or not the helium gas is contained in the sucked gas.

Herein, after inspecting one three-way valve device, the supplied helium gas remains in the three-way valve device. Although the toxicity of the helium gas is not high, it is not preferable to diffuse it into the inspection environment. Therefore, it is necessary to appropriately discharge the remaining helium gas. Furthermore, in order to speed up the inspection, it is necessary that this discharge is performed rapidly.

However, conventionally, no device has been developed for discharging the remaining helium gas appropriately and rapidly.

The present invention has been made based on the above findings. The object of the present invention is to provide an inspection apparatus and an inspection method for inspecting whether or not there is a leakage of a three-way valve device, by which a helium gas remaining in the three-way valve device after inspection can be discharged appropriately and rapidly.

Solution to Problem

One aspect of the present invention is an inspection apparatus for inspecting whether or not there is a leakage of a three-way valve device having a first opening, a second opening, and a third opening, the inspection device including: a sealing member configured to hermetically seal each of the first opening and the second opening; an inspection table configured to support the three-way valve device in such a state that the first opening and the second opening are sealed by the sealing member; a communication part provided through the inspection table and configured to hermetically communicate with the third opening in a state wherein the three-way valve device is supported by the inspection table; an enclosure configured to cover the three-way valve device to form a sealed space except for the communication part in the state wherein the three-way valve device is supported by the inspection table; a helium-gas supply path for supplying a helium gas into the three-way valve device via the communication part and the third opening in a state wherein the sealed space is formed by the enclosure; a leak tester device configured to determine whether or not there is a leakage of the helium gas into the sealed space after the helium gas has been supplied into the three-way valve device; and a helium-gas suction discharge path for suctioning and discharging the helium gas supplied into the three-way valve device, via the third opening and the communication part, after it has been determined whether or not there is the leakage of the helium gas into the sealed space; wherein the helium-gas suction discharge path includes: a compressed-air path through which a compressed air is caused to flow at least after it has been determined whether or not there is the leakage of the helium gas into the sealed space; and a gas draw path that communicates a portion of the compressed-air path with the communication part, configured to draw the helium gas in the three-way valve device into the compressed-air path by using flow of the compressed air as a suction force.

According to the above aspect, the helium gas in the three-way valve device is drawn into the compressed-air path by using flow of the compressed air as a suction force. Thus, it is possible to appropriately and rapidly discharge the helium gas.

Preferably, the enclosure is movable between a position wherein the sealed space is formed and a position wherein the sealed space is opened.

In this case, by moving the enclosure, it is possible to easily switch between a state wherein the sealed space is formed for the three-way valve device (when determining whether or not there is a leakage) and a state wherein the sealed space is opened for the three-way valve device (when attaching or removing the three-way valve device).

In addition, preferably, the helium-gas supply path is provided with a helium-gas supply control valve configured to control start and stop of supplying the helium gas into the three-way valve device via the communication part and the third opening, the compressed-air path is provided with a compressed-air flow control valve configured to control start and stop of causing the compressed air to flow through the compressed-air path, and the gas draw path is provided with a gas draw control valve configured to control start and stop of communicating between the portion of the compressed-air path and the communication part.

In this case, by controlling the respective control valves, it is possible to easily control: the start and stop of supplying the helium gas into the three-way valve device; the start and stop of causing the compressed air to flow through the compressed-air path; and the start and stop of drawing the helium gas in the three-way valve device into the compressed-air path.

In addition, in this case, further preferably, a movement of the enclosure, an operation of the helium-gas supply control valve, an operation of the compressed-air flow control valve, and an operation of the gas draw control valve are automatically controlled by a control device.

According to this feature, it is easy to semi-automatically or automatically perform an inspection as to whether or not there is a leakage of a three-way valve device.

In addition, another aspect of the present invention is an inspection method for inspecting whether or not there is a leakage of a three-way valve device having a first opening, a second opening, and a third opening, the inspection method including: hermetically sealing each of the first opening and the second opening; supporting the three-way valve device in such a state that the first opening and the second opening are sealed, by means of an inspection table, while hermetically communicating the third opening and a communicating part of the supporting table; covering the three-way valve device, by means of an enclosure, to form a sealed space except for the communication part in a state wherein the three-way valve device is supported by the inspection table; supplying a helium gas into the three-way valve device via the communication part and the third opening in a state wherein the sealed space is formed; determining whether or not there is a leakage of the helium gas into the sealed space after the helium gas has been supplied into the three-way valve device; and suctioning and discharging the helium gas supplied into the three-way valve device, via the third opening and the communication part, after it has been determined whether or not there is the leakage of the helium gas into the sealed space; wherein the suctioning and discharging the helium gas includes: causing a compressed air to flow through a compressed-air path; and communicating a portion of the compressed-air path with the communication part and drawing the helium gas in the three-way valve device into the compressed-air path by using flow of the compressed air as a suction force.

According to the above aspect, the helium gas in the three-way valve device is drawn into the compressed-air path by using flow of the compressed air as a suction force. Thus, it is possible to appropriately and rapidly discharge the helium gas.

Preferably, the method further includes: moving the enclosure to open the sealed space after the suctioning and discharging the helium gas.

In this case, it is possible to easily switch between a state wherein the sealed space is formed for the three-way valve device (when determining whether or not there is a leakage) and a state wherein the sealed space is opened for the three-way valve device (when attaching or removing the three-way valve device).

In addition, preferably, the supplying a helium gas includes controlling a helium-gas supply control valve so as to start supplying the helium gas into the three-way valve device via the communication part and the third opening, the causing a compressed air to flow includes controlling a compressed-air flow control valve so as to start causing the compressed air to flow through the compressed-air path, and the drawing the helium gas includes controlling a gas draw control valve so as to communicate between the portion of the compressed-air path and the communication part.

In this case, by controlling the respective control valves, it is possible to easily control: the start of supplying the helium gas into the three-way valve device; the start of causing the compressed air to flow through the compressed-air path; and the start of drawing the helium gas in the three-way valve device into the compressed-air path.

In addition, in this case, further preferably, a movement of the enclosure, a control of the helium-gas supply control valve, a control of the compressed-air flow control valve, and a control of the gas draw control valve are automatically controlled by a control device.

According to this feature, it is easy to semi-automatically or automatically perform an inspection as to whether or not there is a leakage of a three-way valve device.

Furthermore, the principle of the present invention is also applicable to an inspection for a multi-way valve device having four or more openings. That is to say, a further another aspect of the present invention is an inspection apparatus for inspecting whether or not there is a leakage of a multi-way valve device having at least two openings and a further third opening, the inspection device including: a sealing member configured to hermetically seal each of the at least two openings; an inspection table configured to support the multi-way valve device in such a state that the at least two openings are sealed by the sealing member; a communication part provided through the inspection table and configured to hermetically communicate with the third opening in a state wherein the multi-way valve device is supported by the inspection table; an enclosure configured to cover the multi-way valve device to form a sealed space except for the communication part in the state wherein the multi-way valve device is supported by the inspection table; a helium-gas supply path for supplying a helium gas into the multi-way valve device via the communication part and the third opening in a state wherein the sealed space is formed by the enclosure; a leak tester device configured to determine whether or not there is a leakage of the helium gas into the sealed space after the helium gas has been supplied into the multi-way valve device; and a helium-gas suction discharge path for suctioning and discharging the helium gas supplied into the multi-way valve device, via the third opening and the communication part, after it has been determined whether or not there is the leakage of the helium gas into the sealed space; wherein the helium-gas suction discharge path includes: a compressed-air path through which a compressed air is caused to flow at least after it has been determined whether or not there is the leakage of the helium gas into the sealed space; and a gas draw path that communicates a portion of the compressed-air path with the communication part, configured to draw the helium gas in the multi-way valve device into the compressed-air path by using flow of the compressed air as a suction force.

Alternatively, a further another aspect of the present invention is an inspection method for inspecting whether or not there is a leakage of a multi-way valve device having at least two openings and a further third opening, the inspection method including: hermetically sealing each of the at least two openings; supporting the multi-way valve device in such a state that the at least two openings are sealed, by means of an inspection table, while hermetically communicating the third opening and a communicating part of the supporting table; covering the multi-way valve device, by means of an enclosure, to form a sealed space except for the communication part in a state wherein the multi-way valve device is supported by the inspection table; supplying a helium gas into the multi-way valve device via the communication part and the third opening in a state wherein the sealed space is formed; determining whether or not there is a leakage of the helium gas into the sealed space after the helium gas has been supplied into the multi-way valve device; and suctioning and discharging the helium gas supplied into the multi-way valve device, via the third opening and the communication part, after it has been determined whether or not there is the leakage of the helium gas into the sealed space; wherein the suctioning and discharging the helium gas includes: causing a compressed air to flow through a compressed-air path; and communicating a portion of the compressed-air path with the communication part and drawing the helium gas in the multi-way valve device into the compressed-air path by using flow of the compressed air as a suction force.

Furthermore, the principle of the present invention is also applicable to an inspection for a two-way valve device. That is to say, a further another aspect of the present invention is an inspection apparatus for inspecting whether or not there is a leakage of a two-way valve device having two openings, the inspection device including: a sealing member configured to hermetically seal one opening of the two openings; an inspection table configured to support the two-way valve device in such a state that the one opening is sealed by the sealing member; a communication part provided through the inspection table and configured to hermetically communicate with another opening of the two openings in a state wherein the two-way valve device is supported by the inspection table; an enclosure configured to cover the two-way valve device to form a sealed space except for the communication part in the state wherein the two-way valve device is supported by the inspection table; a helium-gas supply path for supplying a helium gas into the two-way valve device via the communication part and the other opening in a state wherein the sealed space is formed by the enclosure; a leak tester device configured to determine whether or not there is a leakage of the helium gas into the sealed space after the helium gas has been supplied into the two-way valve device; and a helium-gas suction discharge path for suctioning and discharging the helium gas supplied into the two-way valve device, via the other opening and the communication part, after it has been determined whether or not there is the leakage of the helium gas into the sealed space; wherein the helium-gas suction discharge path includes: a compressed-air path through which a compressed air is caused to flow at least after it has been determined whether or not there is the leakage of the helium gas into the sealed space; and a gas draw path that communicates a portion of the compressed-air path with the communication part, configured to draw the helium gas in the two-way valve device into the compressed-air path by using flow of the compressed air as a suction force.

Alternatively, a further another aspect of the present invention is an inspection method for inspecting whether or not there is a leakage of a two-way valve device having two openings, the inspection method including: hermetically sealing one opening of the two openings; supporting the two-way valve device in such a state that the one opening is sealed, by means of an inspection table, while hermetically communicating another opening of the two openings and a communicating part of the supporting table; covering the two-way valve device, by means of an enclosure, to form a sealed space except for the communication part in a state wherein the two-way valve device is supported by the inspection table; supplying a helium gas into the two-way valve device via the communication part and the other opening in a state wherein the sealed space is formed; determining whether or not there is a leakage of the helium gas into the sealed space after the helium gas has been supplied into the two-way valve device; and suctioning and discharging the helium gas supplied into the two-way valve device, via the other opening and the communication part, after it has been determined whether or not there is the leakage of the helium gas into the sealed space; wherein the suctioning and discharging the helium gas includes: causing a compressed air to flow through a compressed-air path; and communicating a portion of the compressed-air path with the communication part and drawing the helium gas in the two-way valve device into the compressed-air path by using flow of the compressed air as a suction force.

Advantageous Effects of Invention

According to the present invention, the helium gas in the three-way valve device is drawn into the compressed-air path by using flow of the compressed air as a suction force. Thus, it is possible to appropriately and rapidly discharge the helium gas.

DESCRIPTION OF EMBODIMENTS

Hereinafter, with reference to the attached drawings, we explain an embodiment of the present invention.

Figure 1:
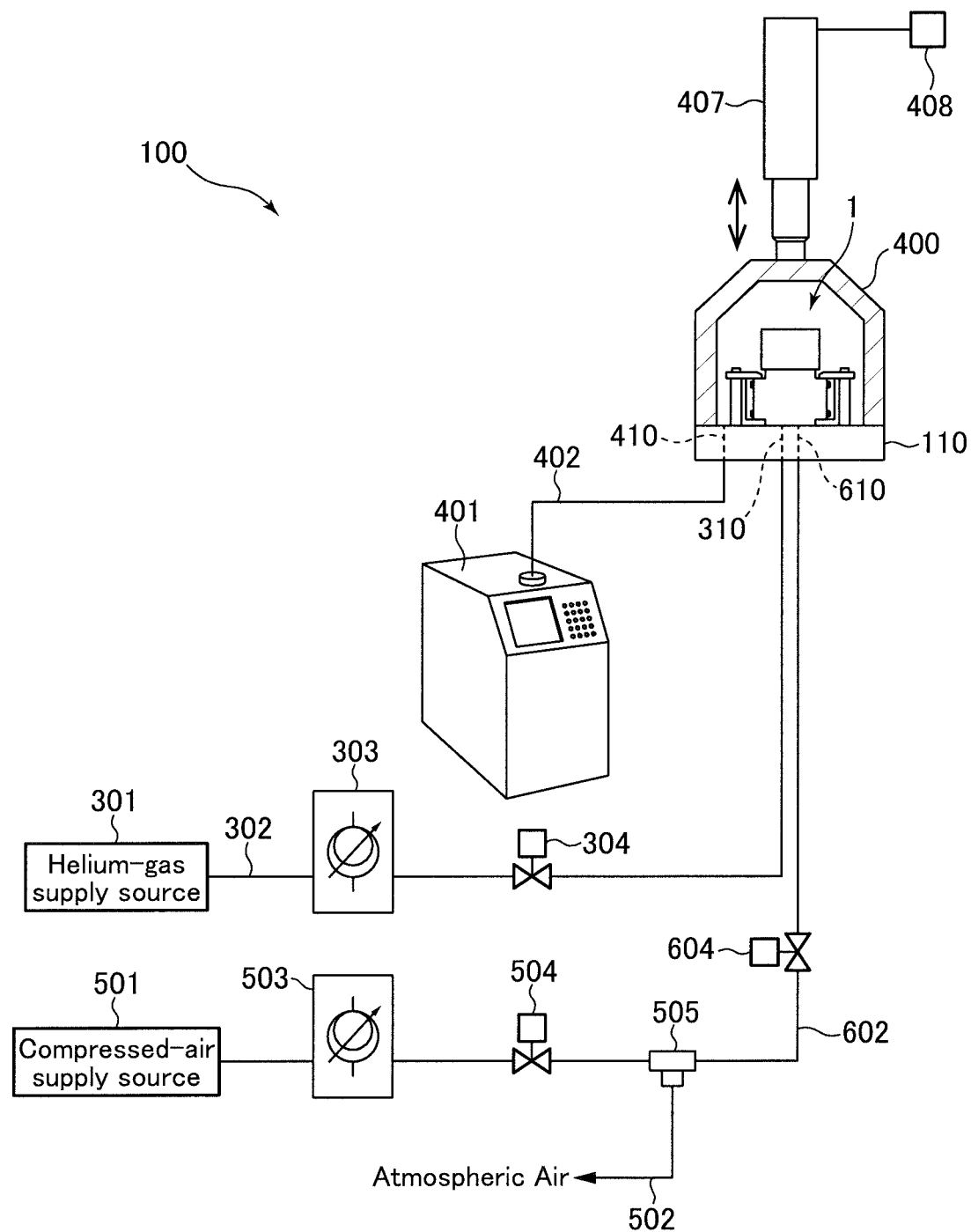
FIG. 1 is a schematic view showing an inspection apparatus according to an embodiment of the present invention.

FIG. 1 is a schematic view showing an inspection apparatus 100 according to an embodiment of the present invention. The inspection apparatus 100 is an inspection apparatus for inspecting whether or not there is a leakage of a three-way valve device 1.

As shown in FIG. 1, the inspection apparatus 100 of the embodiment has an inspection table 110 having a horizontal upper surface, on which the three-way valve device is placed. Two communication holes 310, 610 vertically through the inspection table 110 are provided at a central area of the inspection table 110 (each of the two communication holes 310, 610 forms a portion of a communication part, but the two communication holes 310, 610 may be united (communicated) in the inspection table 110). Then, one inspection hole vertically through the inspection table 110 is provided at a peripheral area of the inspection table 110

Figure 2:
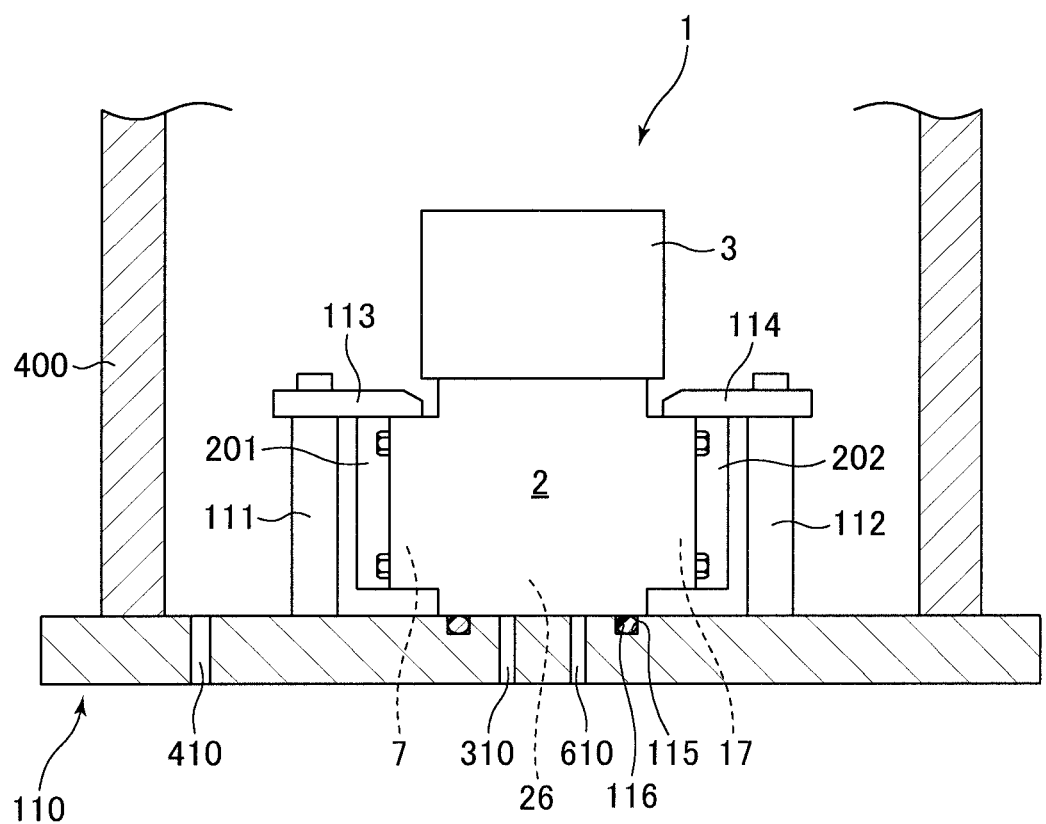
FIG. 2 is an enlarged schematic view in a vicinity of an inspection table of the inspection apparatus of FIG. 1.

FIG. 2 is an enlarged schematic view in a vicinity of the inspection table 110. The three-way valve device 1 for controlling flow rates as described above is placed on the inspection table 110 of FIG. 2, as an object to be inspected. As shown in FIG. 2, in a state wherein the three-way valve device 1 is placed on (supported by) the inspection table, the third opening 26 of the three-way valve device 1 is hermetically communicated with the communication holes 310, 610 via an O-ring 116 (the communication holes 310, 610 are provided inner than the O-ring 116). For example, the O-ring 116 is contained in a sealing groove 115 formed on the upper surface of the inspection table 110.

A sealing member 201, 202, which is configured to hermetically seal each of the first opening 7 and the second opening 17 of the three-way valve device 1, is hermetically connected to each of the first opening 7 and the second opening 17 of the three-way valve device 1, for example via an O-ring. For example, the sealing member 201, 202 has a rectangular plate-like shape and is fixed to the first flange member 10 and the second flange member 19 by means of bolts not shown.

In order to fix a state wherein the three-way valve device 1 is placed on (supported by) the inspection table 110, two column members 111, 112 are erected from on the upper surface of the inspection table 110 of the present embodiment. In addition, holding arms 113, 114 being rotatable with respect to the column members 111, 112 are provided at upper positions of the column members 111, 112. Accordingly, in a state wherein the O-ring 116 is compressed, the holding arms 113, 114 are rotated to positions shown in FIG. 2, so that the upper surface of the valve part 2 of the three-way valve device 1 (specifically, the respective upper surfaces of the first flange member 10 and the second flange member 19) is pressed downward, and the three-way valve device 1 is fixed on the inspection table 110.

Subsequently, the inspection apparatus 100 of the present embodiment includes an enclosure 400 configured to cover the three-way valve device 1 to form a sealed space except for the communication holes 310, 610 in the state wherein the three-way valve device 1 is supported by the inspection table 110 as shown in FIG. 2 and wherein the first opening 7 and the second opening 17 are sealed by the sealing members 201, 202.

As shown in FIG. 1, the enclosure 400 of the preset embodiment is configured to cover the upper side and the lateral sides of the three-way valve device 1 and to form a sealed space except for the communication holes 310, 610 by hermetically abutting with the upper surface of the inspection table 110 (any known sealing mechanism may be adopted).

In addition, the enclosure 400 of the present embodiment is vertically movable by means of an air cylinder 407. The air cylinder 407 is controlled by a control device 408 such as a computer. Accordingly, it is possible to easily and freely switch between a state wherein the sealed space is formed by hermetically abutting with the upper surface of the inspection table 110 and a state wherein the sealed space is opened by moving away from the upper surface of the inspection table 110.

Subsequently, the inspection apparatus 100 of the present embodiment includes a helium-gas supply path 302 for supplying a helium gas into the three-way valve device 1 via the communication hole 310 (a portion of the communication part) and the third opening 26 in a state wherein the sealed space is formed by the enclosure 400.

The helium-gas supply path 302 starts from a helium-gas supply source 301, passes through a regulator 303 and a helium-gas supply control valve 304, and is hermetically connected to the communication hole 310. The helium-gas supply control valve 304 is also controlled by the control device 408.

In addition, as shown in FIG. 1, the inspection apparatus 100 of the present embodiment includes a leak tester device 401 (for example, MSE-2400: manufactured by Shimadzu Corporation) configured to determine whether or not there is a leakage of the helium gas into the sealed space after the helium gas has been supplied into the three-way valve device 1. The leak tester device 401 is also controlled by the control device 408.

In the present embodiment, the leak tester device 401 and the inspection hole 410 are hermetically connected via a leak inspection path 402. The leak tester device 401 has a vacuum pump 405 to create a vacuum (evacuate a gas) in the sealed space via the inspection hole 410 (for example, the pressure can be reduced to less than 3 Pa). The leak tester device 401 can detect whether or not the helium gas leaks from the three-way valve device 1 toward the evacuated sealed space (for example, if the detected amount of the helium gas for 60 seconds is $5 \times 10^{-7}$ Pa·m$^3$/sec or less, it is determined that there is no leakage, and if it exceeds the above value, it is determined that there is a leakage). Furthermore, after evacuating the sealed space by using the vacuum pump 405 to determine whether or not there is a leakage in the three-way valve device 1, the leak tester device 401 can release the leak inspection path 402 to the atmosphere so that the pressure in the sealed space is returned to the atmospheric pressure.

In addition, as shown in FIG. 1, the inspection apparatus 100 of the present embodiment includes a helium-gas suction discharge path 502, 602 for suctioning and discharging the helium gas supplied into the three-way valve device 1, via the third opening 26 and the other communication hole 610 (another portion of the communication part), after it has been determined whether or not there is the leakage of the helium gas from the three-way valve device 1 into the sealed space.

The helium-gas suction discharge path 502, 602 of the present embodiment includes: a compressed-air path 502 through which a compressed air is caused to flow; and a gas draw path 602 that communicates an ejector 505 provided on the way of the compressed-air path 502 with the communication hole 610.

The compressed-air path 502 starts from a compressed-air supply source 501, passes through a regulator 503 and a compressed-air flow control valve 504, reaches the ejector 505 where the gas draw path 602 is merged, and extends toward an atmosphere releasing path not shown.

In the present embodiment, the compressed air is caused to flow through the compressed-air path 502 at least after it has been determined whether or not there is the leakage of the helium gas from the three-way valve device 1 into the sealed space, by a control of the compressed-air flow control valve 504 by the control device 408.

In addition, in the present embodiment, start and stop of communicating between the ejector 505 of the compressed-air path 502 and the communication part 610 is controlled by a gas draw control valve 604. The gas draw control valve 604 is also controlled by the control device 408. Accordingly, by communicating between the ejector 505 of the compressed-air path 502 and the communication part 610, the flow of the compressed air serves as a suction force, so that the helium gas in the three-way valve device 1 is drawn into the compressed-air path 502.

Next, an example of an inspection method by using the inspection apparatus 100 of the present embodiment is explained.

At first, the sealing members 201, 202 are hermetically connected to each of the first opening 7 and the second opening 17 of the three-way valve device 1 to be inspected, for example via an O-ring. The sealing members 201, 202 are fixed to the first flange member 10 and the second flange member 19, for example by means of bolts not shown.

On the other hand, the enclosure 400 in the initial state is in a state wherein the enclosure 400 is away from the upper surface of the inspection table 110 so that the sealed space is opened. Then, the three-way valve device 1, in a state wherein the first opening 7 and the second opening 17 are sealed by the sealing members 201, 202, is oriented in a posture in which the third opening 26 faces downward, and is placed on the inspection table 110 while being positioned so that the third opening 26 is located inner than the O-ring 116.

Then, in a state wherein the O-ring 116 is compressed, the holding arms 113, 114 are rotated to positions shown in FIG. 2, so that the upper surface of the valve part 2 of the three-way valve device 1 (specifically, the respective upper surfaces of the first flange member 10 and the second flange member 19) is pressed downward, and thus the three-way valve device 1 is fixed on the inspection table 110.

Each of the above operations (steps) is performed manually by an inspection operator.

Subsequently, for example based on an input for an inspection start by the inspection operator, the control device 408 controls the air cylinder 407 to move down the enclosure 400. Then, as shown in FIG. 1, the enclosure 400 of the present embodiment covers the upper side and the lateral sides of the three-way valve device 1, and the sealed space except for the communication holes 310, 610 is formed by hermetically abutting with the upper surface of the inspection table 110. In this state, the moving down of the enclosure 400 is stopped.

Figure 3:
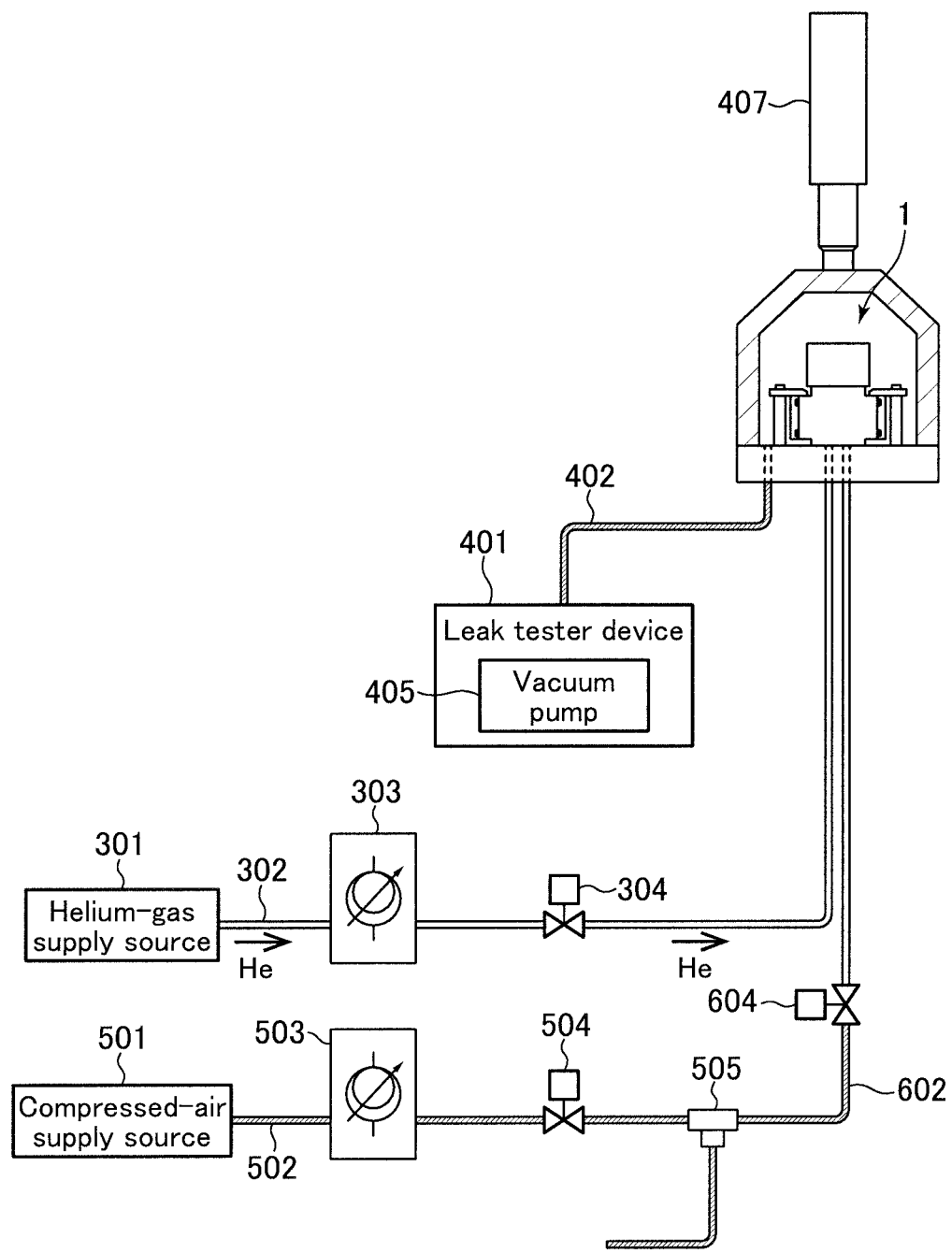
FIG. 3 is a schematic view of the inspection apparatus of FIG. 1 when a helium gas is supplied into a three-way valve device.

Then, the control device 408 controls the helium gas supply control valve 304 to start supplying of helium gas into the three-way valve device 1 through the communication hole 310 and the third opening 26. This state is illustrated in FIG. 3. Accordingly, the helium gas spreads in a region communicating with the third opening 26 in the three-way valve device 1. The supply pressure of the helium gas is adjusted to 0.45 MPa, for example, by the action of the regulator 303.

The supply of the helium gas is performed for a predetermined time, for example. That is to say, after the predetermined time has elapsed, the control device 408 controls the helium gas supply control valve 304 to stop supplying of the helium gas into the three-way valve device 1 via the communication hole 310 and the third opening 26.

Figure 4:
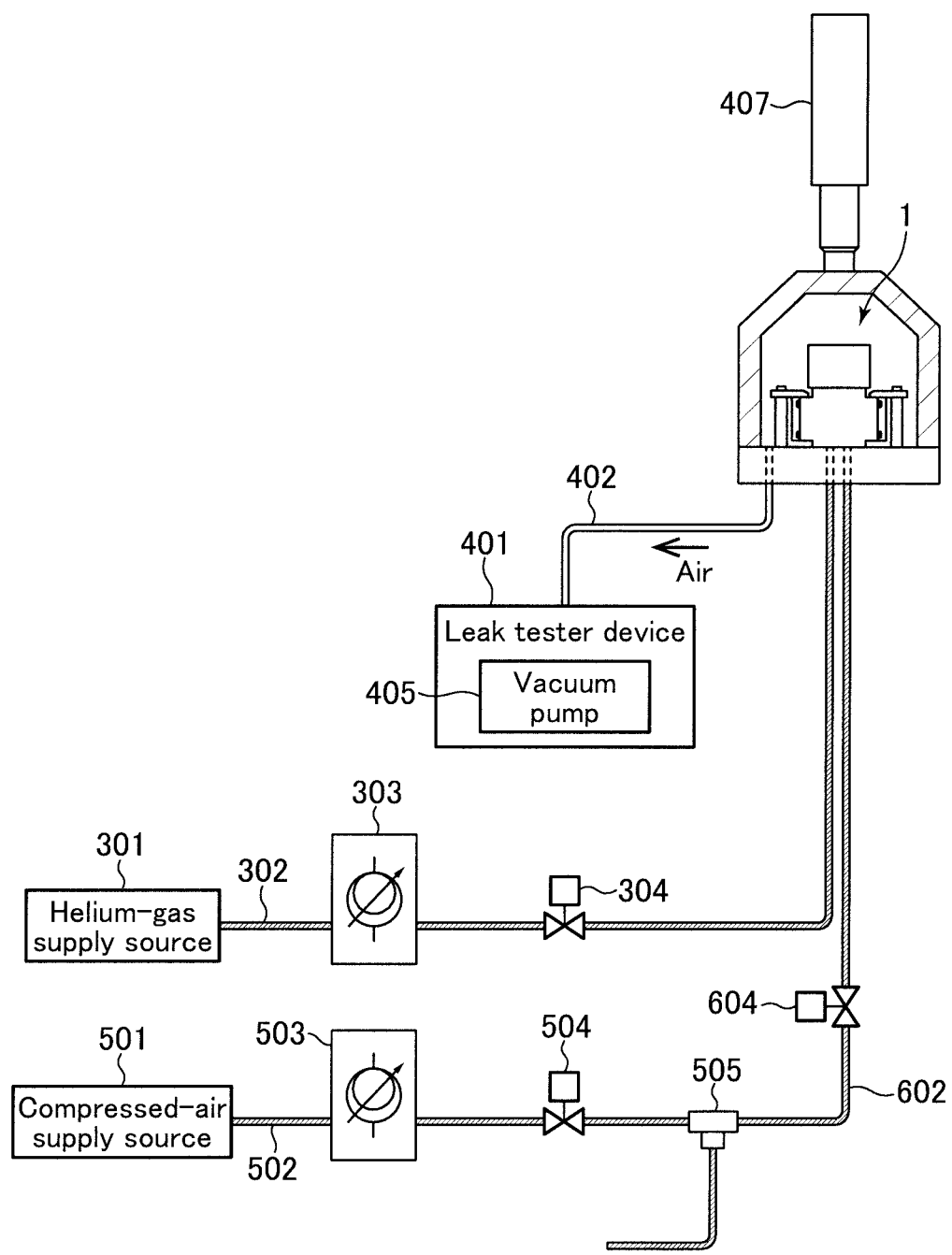
FIG. 4 is a schematic view of the inspection apparatus of FIG. 1 when a sealed space is evacuated.

Subsequently, the control device 408 controls the leak tester device 401 to start evacuation of the sealed space through the inspection hole 410. This state is illustrated in FIG. 4. Thereby, the pressure in the sealed space is reduced to, for example, less than 3 Pa.

Figure 5:
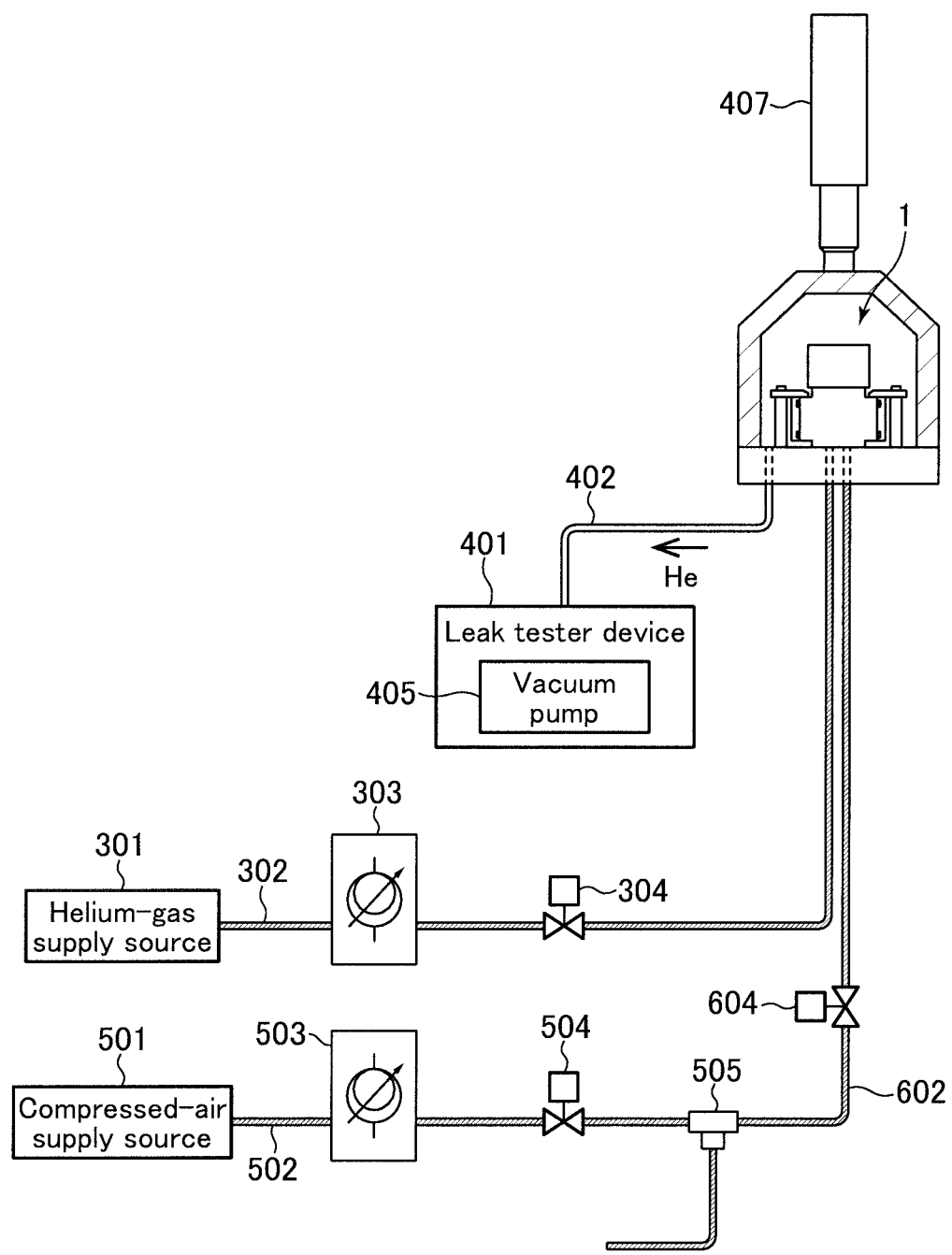
FIG. 5 is a schematic view of the inspection apparatus of FIG. 1 when it is determined whether or not there is a leakage from the three-way valve device into the sealed space.

Under such a reduced-pressure condition, it is determined whether or not there is a leakage of the three-way valve device 1. Specifically, the leak tester device 401 detects an amount of the helium gas from the sealed space after the evacuation. For example, if the detected amount of the helium gas for 60 seconds is $5 \times 10^{-7}$ Pa·m$^3$/sec or less, it is determined that there is no leakage, and if it exceeds the above value, it is determined that there is a leakage. This state is illustrated in FIG. 5.

Figure 6:
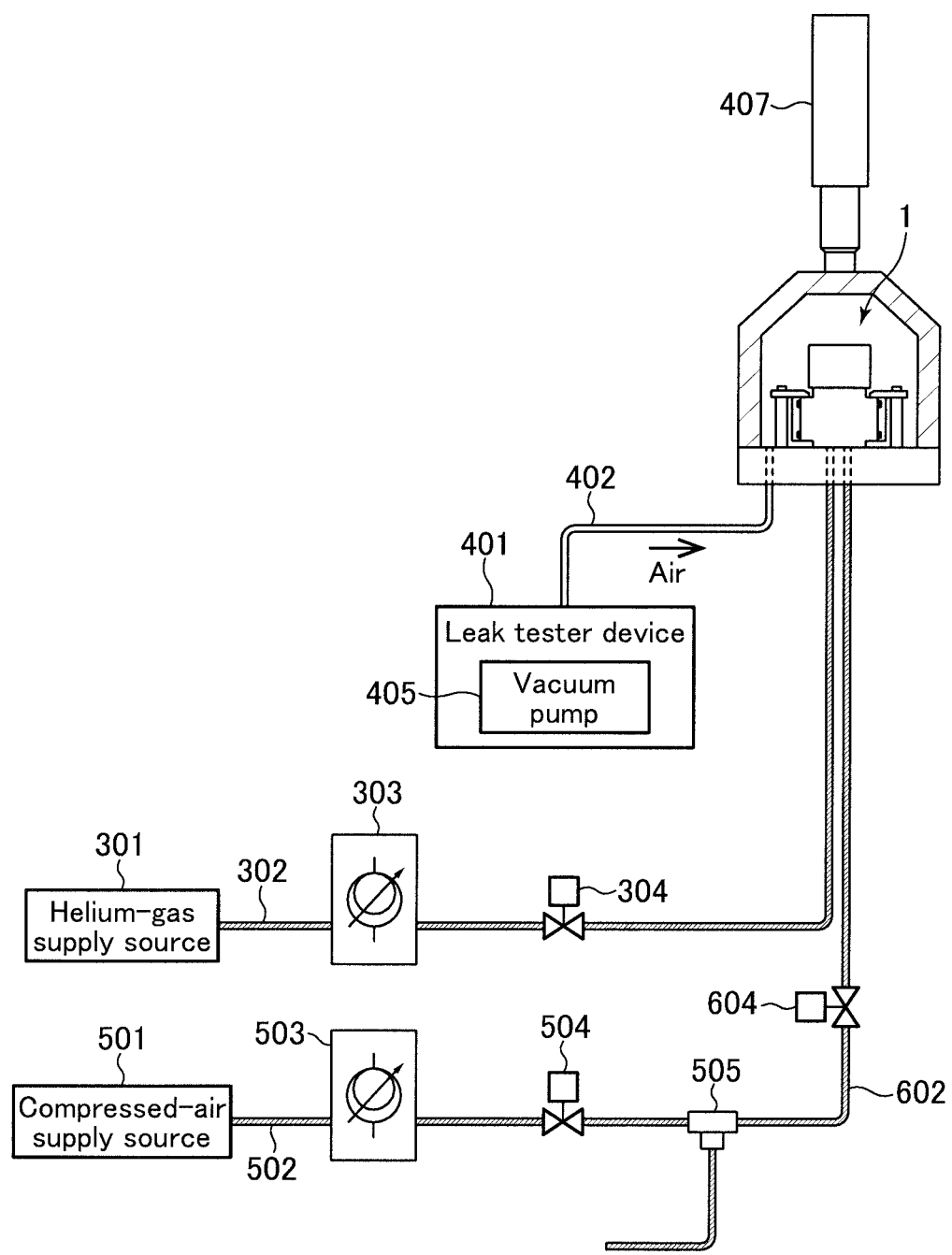
FIG. 6 is a schematic view of the inspection apparatus of FIG. 1 when the sealed space is returned to the atmospheric pressure.

After determining whether or not there is a leakage in the three-way valve device 1, the leak tester device 401 releases the leak inspection path 402 to the atmosphere so that the pressure in the sealed space is returned to the atmospheric pressure. This state is illustrated in FIG. 6. Thereafter, the control device 408 controls the leak tester device 401 to stop the operation of the leak tester device 401.

Figure 7:
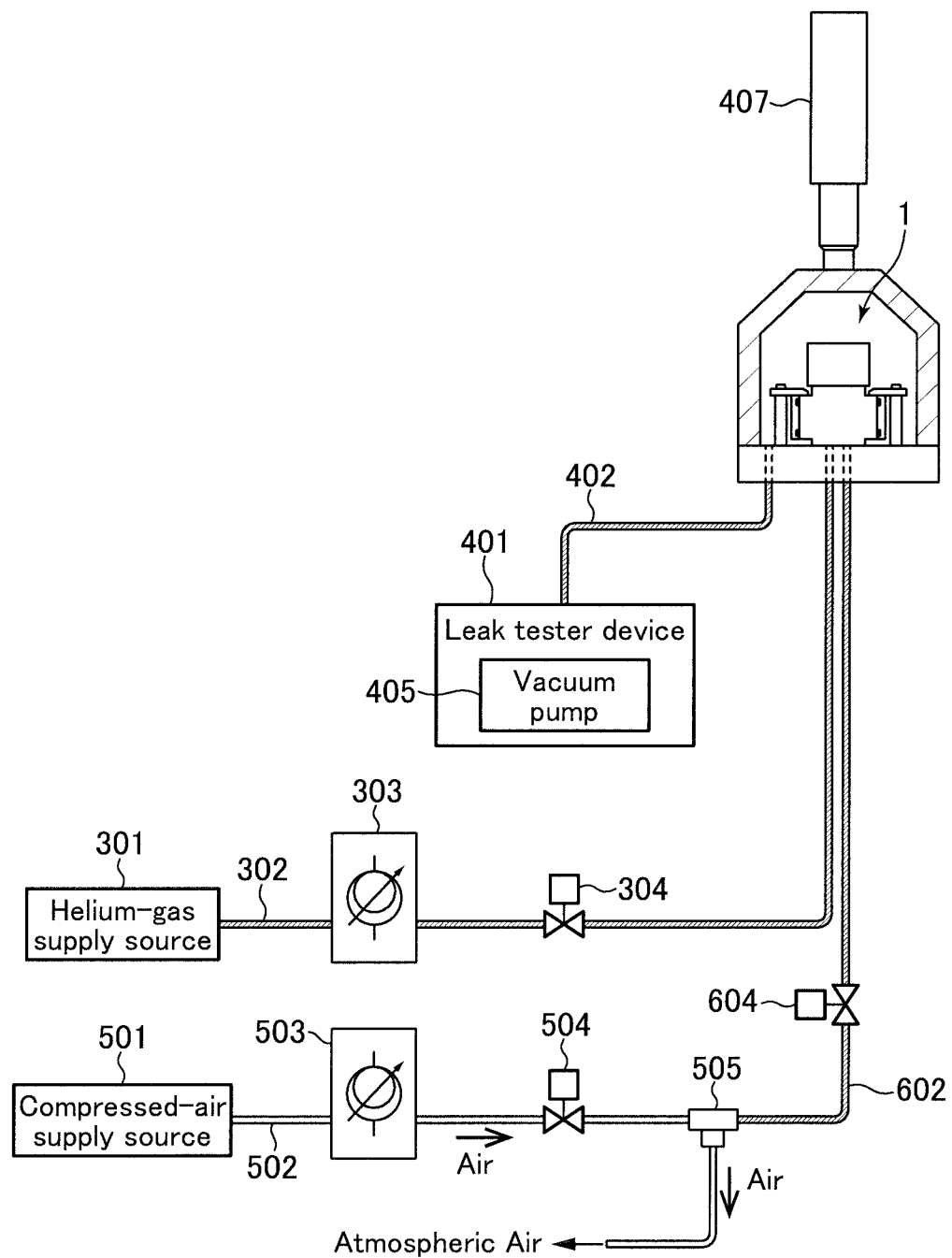
FIG. 7 is a schematic view of the inspection apparatus of FIG. 1 when the compressed-air is caused to flow through the compressed-air path.

After returning the pressure in the sealed space to the atmospheric pressure, or in parallel with the step of returning the pressure in the sealed space to the atmospheric pressure, the control device 408 controls the compressed-air flow control valve 504 to start causing the compressed air to flow through the compressed-air path 502. This state is illustrated in FIG. 7. The supply pressure of the compressed air is adjusted to 0.55 MPa, for example, by the action of the regulator 503.

Figure 8:
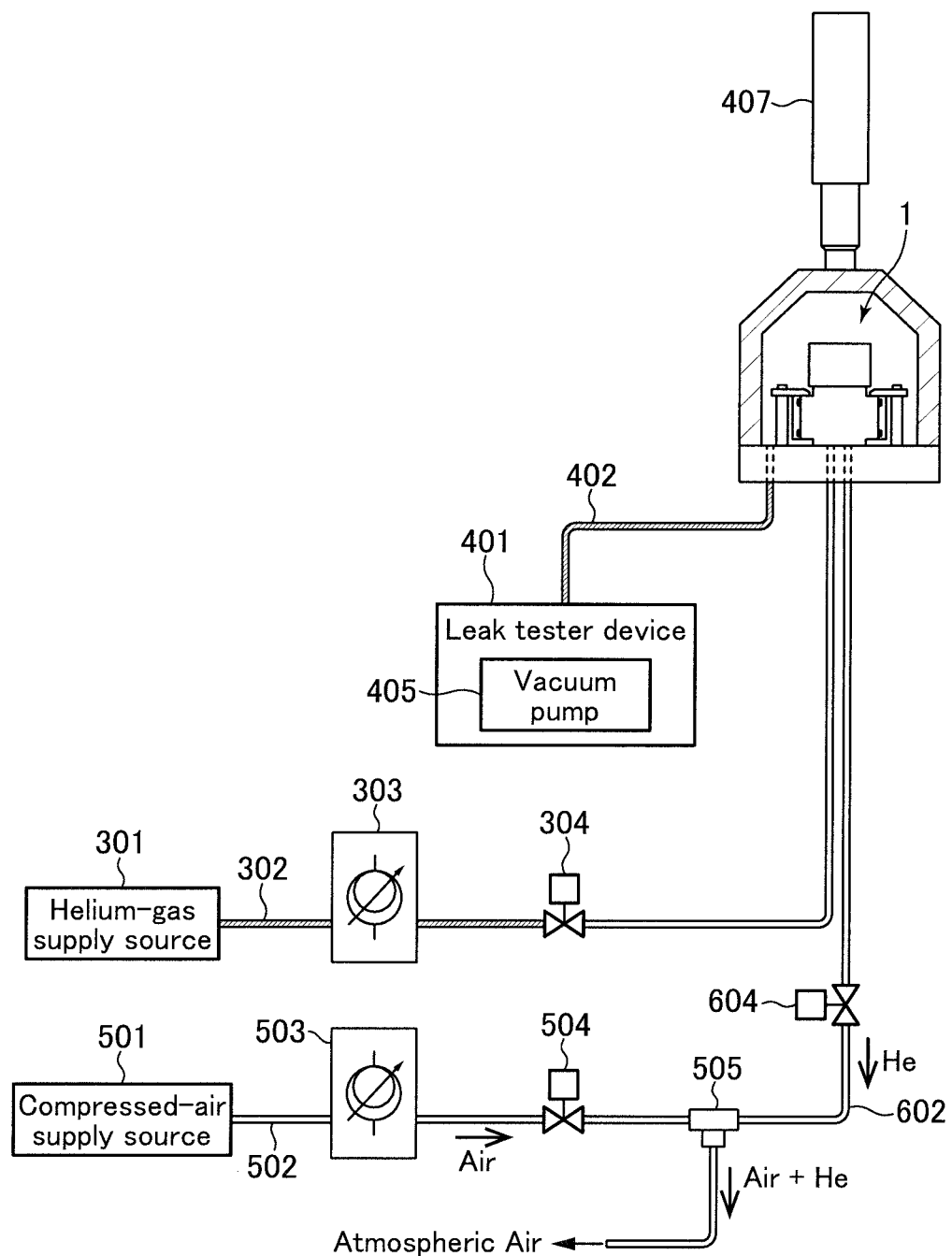
FIG. 8 is a schematic view of the inspection apparatus of FIG. 1 when the helium gas is sucked and discharged from the three-way valve device into the compressed-air path.

Then, the control device 408 controls the gas draw control valve 604 to start communicating between the ejector 505 of the compressed air passage 502 and the communication hole 610. Accordingly, the flow of compressed air acts as a suction force so that the helium gas in the three-way valve device 1 is drawn into the compressed air path 502 via the ejector 505. This state is illustrated in FIG. 8.

Figure 9:
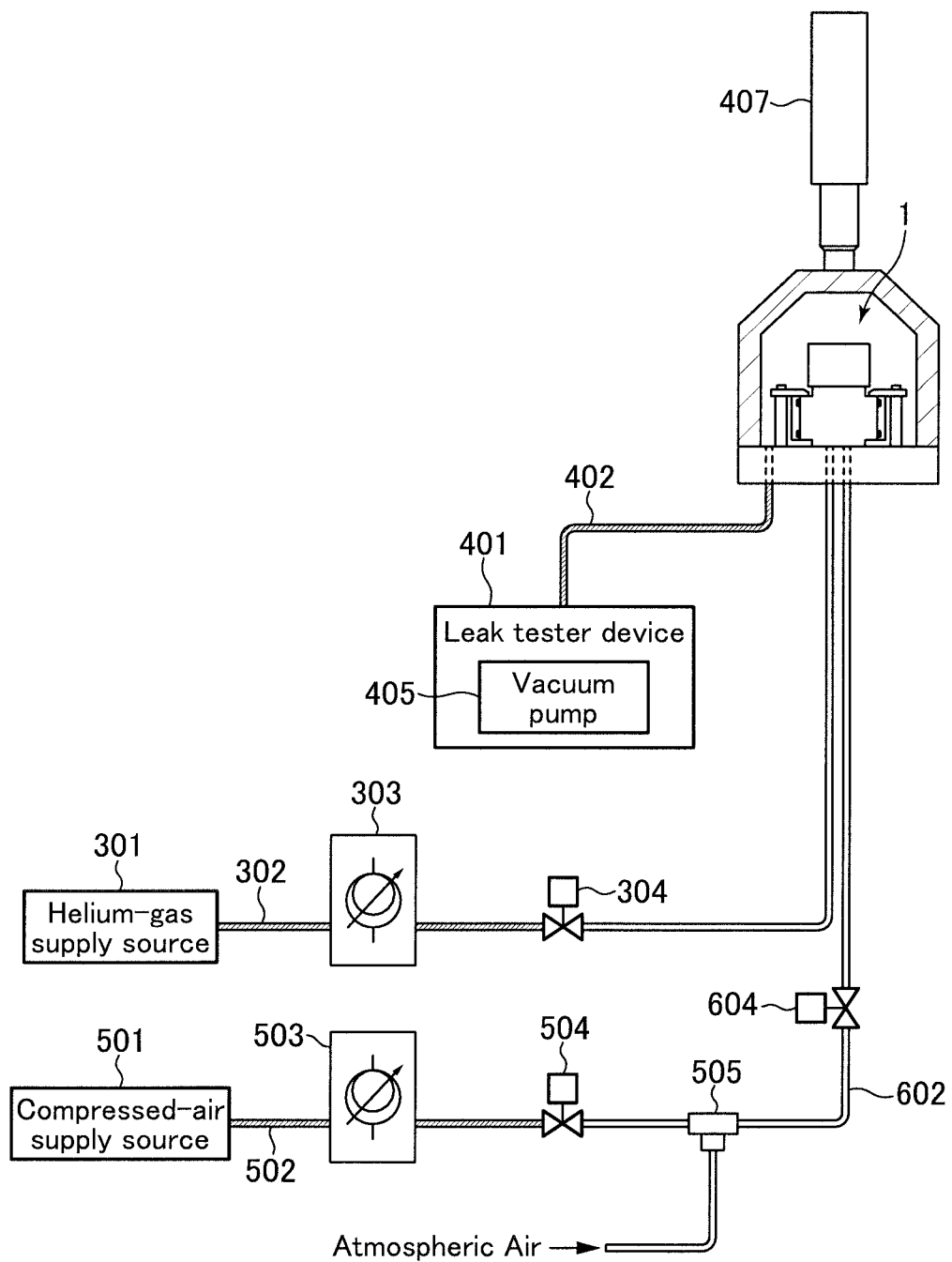
FIG. 9 is a schematic view of the inspection apparatus of FIG. 1 when the three-way valve device is returned to the atmospheric pressure.

The sucking and discharging of the helium gas is performed for a predetermined time, for example. That is to say, after the predetermined time has elapsed, the control device 408 controls the compressed-air flow control valve 504 to stop causing the compressed air to flow through the compressed-air path 502. Thereby, the atmospheric air flows adversely from the atmosphere releasing path (not shown) connected to the compressed-air path 502 toward the compressed-air path 502 so that the atmospheric air reaches the three-way valve device 1 through the gas draw path 602 and the communication hole 610 to return the pressure in the three-way valve device 1 to the atmospheric pressure. This state is illustrated in FIG. 9.

Thereafter, the control device 408 controls the air cylinder 407 to move up the enclosure 400. Then, by a manual operation of the inspection operator again, the inspected three-way valve device 1 is removed from the inspection table 110 and a next three-way valve device 1 to be inspected is attached to the inspection table 110. Then, the automatic steps starting from the moving down of the enclosure 400 by the control device 408 are repeated.

As described above, according to the present embodiment, the helium gas remaining in the three-way valve device 1 is drawn into the compressed-air path 502 by using the flow of the compressed air as a suction force. Thus, it is possible to appropriately and rapidly discharge the helium gas.

In addition, according to the present embodiment, the enclosure 400 is movable by means of the air cylinder 407 between the position wherein the sealed space is formed and the position wherein the sealed space is opened. Thereby, it is possible to easily switch between the state wherein the sealed space is formed for the three-way valve device 1 (when determining whether or not there is a leakage) and the state wherein the sealed space is opened for the three-way valve device 1 (when attaching or removing the three-way valve device 1).

In addition, according to the present embodiment, by controlling the helium-gas supply control valve 304, the compressed-air flow control valve 504 and the gas draw control valve 604 suitably, it is possible to easily and freely control: the start and stop of supplying the helium gas into the three-way valve device 1; the start and stop of causing the compressed air to flow through the compressed-air path 502; and the start and stop of drawing the helium gas in the three-way valve device 1 into the compressed-air path 502.

In addition, according to the present embodiment, the movement of the enclosure 400, the operation of the helium-gas supply control valve 304, the operation of the compressed-air flow control valve 504, and the operation of the gas draw control valve 604 are automatically controlled by the control device 408. According to this feature, it is possible to semi-automatically perform an inspection as to whether or not there is a leakage of the three-way valve device 1.

The method for fixing the three-way valve device 1 to the inspection table 110 is not limited to the manner wherein the rotatable holding arms 113, 114 are used as in the above-described embodiment, but any known configuration (mechanism) may be adopted.

In addition, the communication holes 310, 610 and the inspection hole 410 extend in the vertical direction in the inspection table 110, but are not limited to this matter. Each of them may be opened on a lateral surface of the inspection table 110, instead of being opened on the lower surface of the inspection table 110.

Furthermore, in the present invention, the posture of the three-way valve device 1 supported by the inspection table is not limited to that of the above embodiment. For example, the three-way valve device 1 may be oriented in a posture in which the third opening 26 faces in a horizontal direction, and may be fixed to an inspection table while being positioned so that the third opening 26 is located inner than an O-ring provided on an abutting surface extending in a vertical direction. In this case, communication holes 310, 610 for communicating with the third opening 26 may also be opened on an abutting surface extending in the same vertical direction.

In addition, the principle of the present invention is also applicable to an inspection for a multi-way valve device having four or more openings. In this case, a sealing member is hermetically connected to each of all the openings of the multi-way valve device to be inspected except for the third opening 26, for example via an O-ring.

The other structure of the inspection apparatus for such a multi-way valve device, and the method of using the inspection apparatus (the inspection method) are substantially the same as the above-described embodiment (the inspection apparatus for a three-way valve device). Thus, their detailed explanations are omitted.

Figure 10:
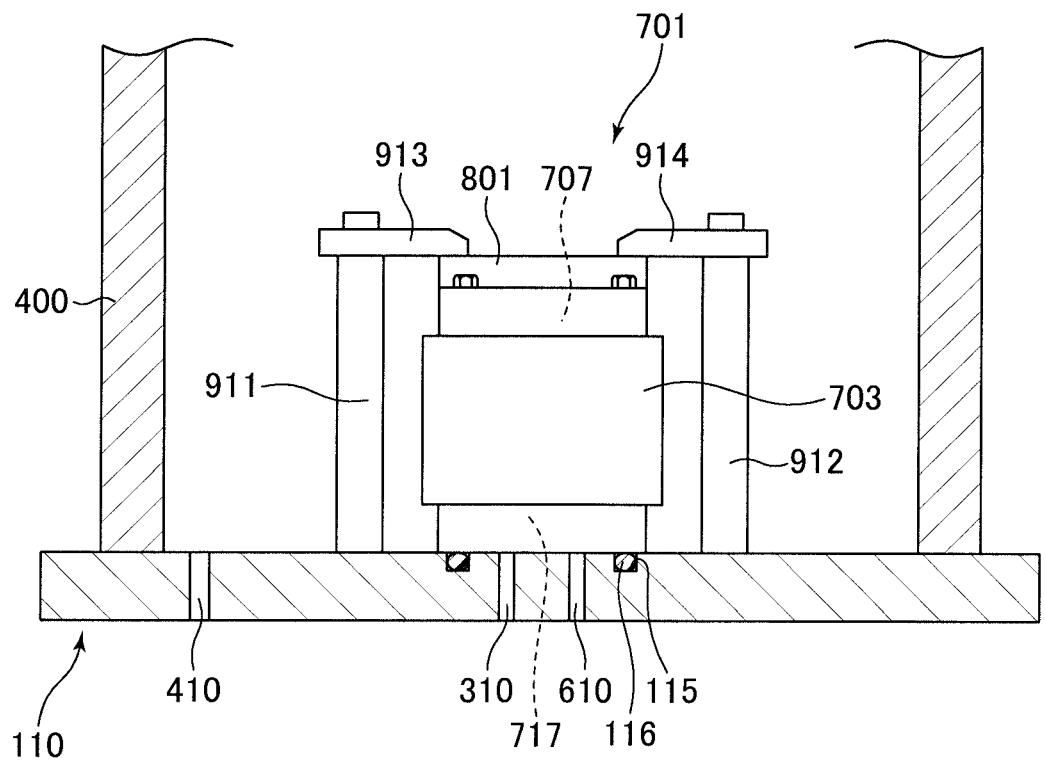
FIG. 10 is an enlarged schematic view in a vicinity of an inspection table of an inspection apparatus according to another embodiment of the present invention.
Figure 11:
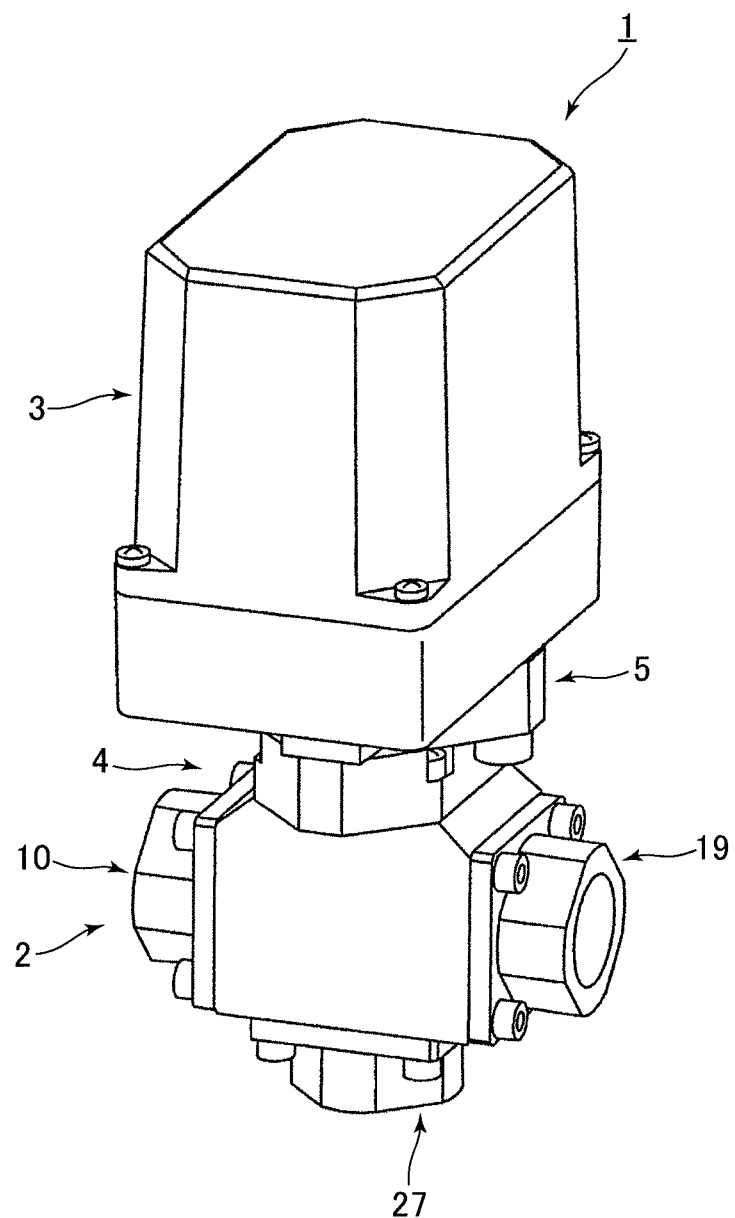
FIG. 11 is a schematic perspective view of a three-way valve device for controlling flow rates, which is an example of a three-way valve device (corresponding to FIG. 1 of JP 6104443 B)
Figure 12:
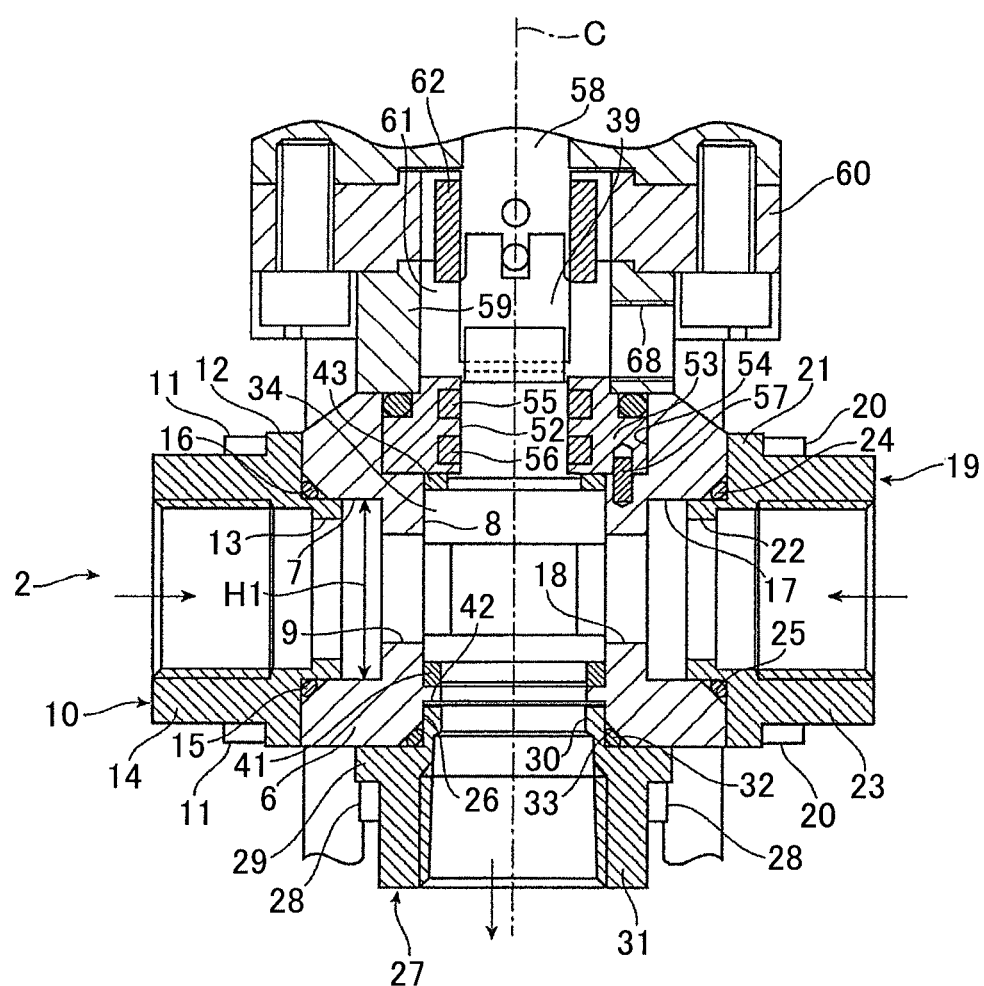
FIG. 12 is a longitudinal section view of the three-way valve device for controlling flow rates of FIG. 11 (corresponding to FIG. 3 of JP 6104443 B)
Figure 13:
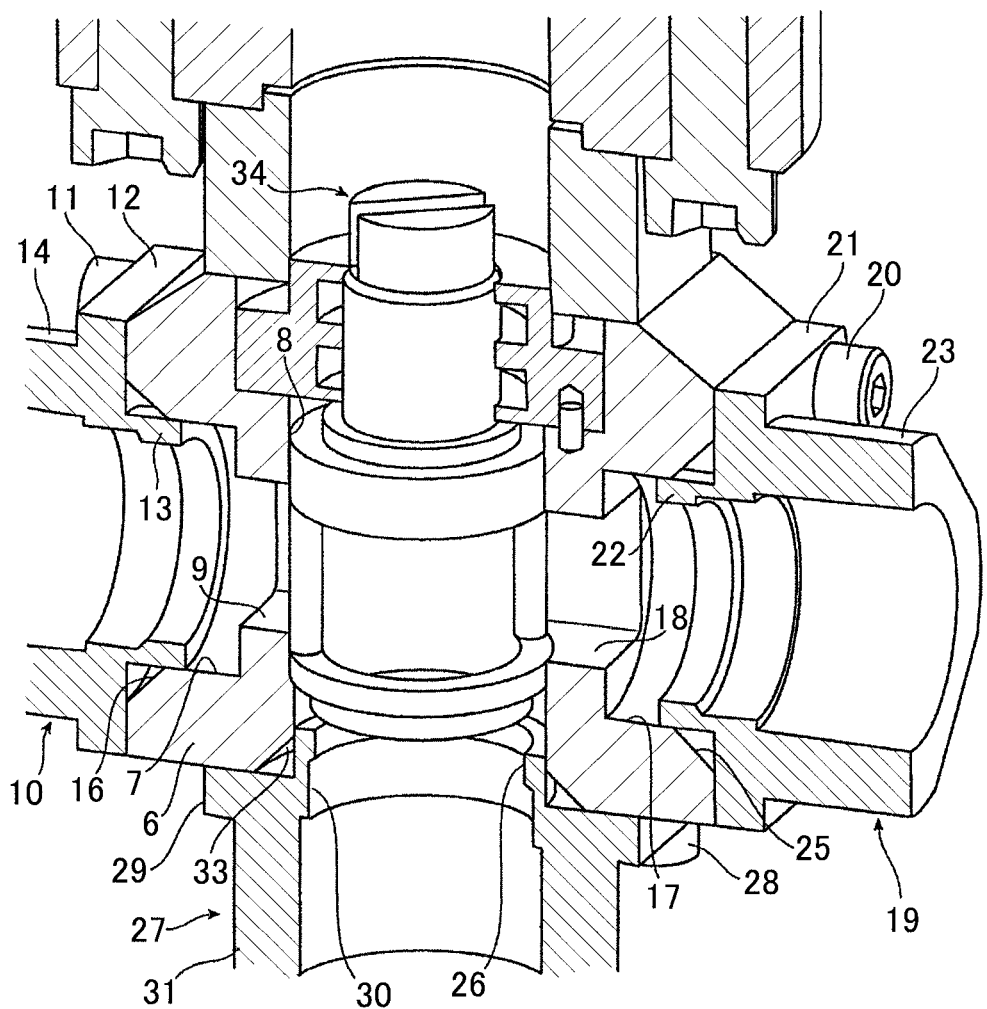
FIG. 13 is an exploded perspective view of the three-way valve device for controlling flow rates of FIG. 11 (corresponding to FIG. 4 of JP 6104443 B)
Figure 13:
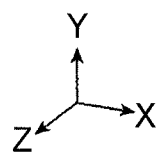
Figure 14:
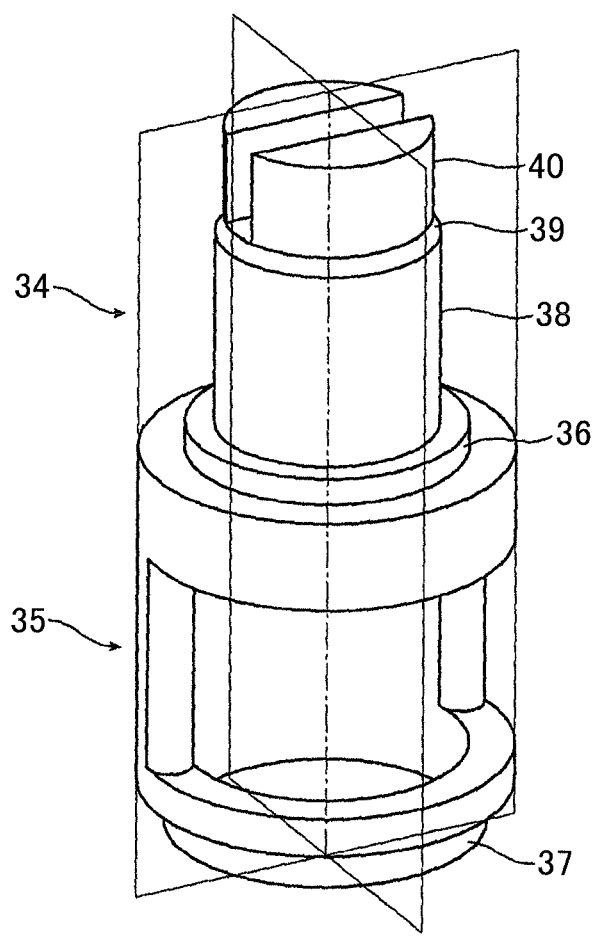
FIG. 14 is a perspective view of a valve shaft in the three-way valve device for controlling flow rates of FIGS. 11 to 13 (corresponding to FIG. 6(a) of JP 6104443 B).

In addition, the principle of the present invention is also applicable to an inspection for a two-way valve device. FIG. 10 is an enlarged schematic view in a vicinity of an inspection table of an inspection apparatus according to another embodiment corresponding to this case. As shown in FIG. 10, a sealing member 801 is hermetically connected to one opening 707 of a two-way valve device 701 to be inspected, for example via an O-ring.

Then, the two-way valve device 701, in a state wherein the one opening 707 is sealed by the sealing member 801, is oriented in a posture in which the other opening 717 faces downward, and is placed on the inspection table 110 while being positioned so that the other opening 717 is located inner than the O-ring 116.

Then, in a state wherein the O-ring 116 is compressed, holding arms 913, 914 being rotatable with respect to column members 911, 912 are rotated to positions shown in FIG. 10, so that the two-way valve device 701 is pressed downward, for example via an upper surface of the sealing member 801, and thus the two-way valve device 701 is fixed on the inspection table 110. In FIG. 10, the reference sign 703 represents an actuator part of the two-way valve device 701.

The other structure of the inspection apparatus for such a two-way valve device, and the method of using the inspection apparatus (the inspection method) are substantially the same as the above-described embodiment (the inspection apparatus for a three-way valve device). Thus, their detailed explanations are omitted.

DESCRIPTION OF REFERENCE SIGNS

1 Three-way valve device (three-way valve derive for controlling flow rates)
2 Valve part
3 Actuator part
4 Sealing part
5 Coupling part
6 Valve body
7 First opening 8 Valve seat
9 First valve port
10 First flange member
11 Hexagon socket head bolt
12 Flange part
13 Insertion part
14 Pipe connection part
15 O-ring
16 Chamfer
17 Second opening
18 Second valve port
19 Second flange member
20 Hexagon socket head bolt
21 Flange part
22 Insertion part
23 Pipe connection part
26 Third opening
27 Third flange member
28 Hexagon socket head bolt
29 Flange part
30 Insertion part
31 Pipe connection part
32 O-ring
33 Chamfer
34 Valve shaft
35 Valve part
36 Upper shaft supporting part
37 Lower shaft supporting part
38 Sealing part
39 Tapered part
40 Coupling part
41 Bearing
42 Supporting part
43 Thrust washer
52 Insertion hole
53 Sealing housing
54 Recess
55 O-ring
56 O-ring
57 Parallel pin
58 Rotary shaft
59 Spacer member
60 Adapter plate
61 Internal space
62 Coupling member
100 Inspection apparatus for inspecting whether or not there is leakage of three-way valve device
110 Inspection table
111 Column member
112 Column member
113 Holding arm
114 Holding arm
115 Sealing groove
116 O-ring
201 Sealing member
202 Sealing member
301 Helium-gas supply source
302 Helium-gas supply path
303 Regulator
304 Helium-gas supply control valve
310 Communication hole (for supplying helium gas)
400 Enclosure
401 Leak tester device
402 Leak inspection path
405 Vacuum pump
407 Air cylinder
408 Control device
410 Inspection hole
501 Compressed-air supply source
502 Compressed air path
503 Regulator
504 Compressed-air flow control valve
505 Ejector
602 Gas draw path
604 Gas draw control valve
610 Communication hole (for discharging helium gas)
701 Two-way valve device (two-way valve derive for controlling flow rate)
703 Actuator part
707 One opening
717 Other opening (corresponding to third opening)
801 Sealing member
911 Column member
912 Column member
913 Holding arm
914 Holding arm

What is claimed is:

1. An inspection apparatus for inspecting whether or not there is a leakage of a three-way valve device having a first opening, a second opening, and a third opening, the inspection device comprising:
a sealing member configured to hermetically seal each of the first opening and the second opening;
an inspection table configured to support the three-way valve device in such a state that the first opening and the second opening are sealed by the sealing member;
a communication part provided through the inspection table and configured to hermetically communicate with the third opening in a state wherein the three-way valve device is supported by the inspection table;
an enclosure configured to cover the three-way valve device to form a sealed space except for the communication part in the state wherein the three-way valve device is supported by the inspection table;
a helium-gas supply path for supplying a helium gas into the three-way valve device via the communication part and the third opening in a state wherein the sealed space is formed by the enclosure;
a leak tester device configured to determine whether or not there is a leakage of the helium gas into the sealed space after the helium gas has been supplied into the three-way valve device; and
a helium-gas suction discharge path for suctioning and discharging the helium gas supplied into the three-way valve device, via the third opening and the communication part, after it has been determined whether or not there is the leakage of the helium gas into the sealed space;
wherein
the helium-gas suction discharge path includes:
a compressed-air path through which a compressed air is caused to flow at least after it has been determined whether or not there is the leakage of the helium gas into the sealed space; and
a gas draw path that communicates a portion of the compressed-air path with the communication part, configured to draw the helium gas in the three-way valve device into the compressed-air path by using flow of the compressed air as a suction force.

2. The inspection apparatus according to claim 1, wherein the enclosure is movable between a position wherein the sealed space is formed and a position wherein the sealed space is opened.

3. The inspection apparatus according to claim 2, wherein
the helium-gas supply path is provided with a helium-gas supply control valve configured to control start and stop of supplying the helium gas into the three-way valve device via the communication part and the third opening,
the compressed-air path is provided with a compressed-air flow control valve configured to control start and stop of causing the compressed air to flow through the compressed-air path, and
the gas draw path is provided with a gas draw control valve configured to control start and stop of communicating between the portion of the compressed-air path and the communication part.

4. The inspection apparatus according to claim 3, wherein a movement of the enclosure, an operation of the helium-gas supply control valve, an operation of the compressed-air flow control valve, and an operation of the gas draw control valve are automatically controlled by a control device.

5. An inspection method for inspecting whether or not there is a leakage of a three-way valve device having a first opening, a second opening, and a third opening, the inspection method comprising:
hermetically sealing each of the first opening and the second opening;
supporting the three-way valve device in such a state that the first opening and the second opening are sealed, by means of an inspection table, while hermetically communicating the third opening and a communicating part of the supporting table;
covering the three-way valve device, by means of an enclosure, to form a sealed space except for the communication part in a state wherein the three-way valve device is supported by the inspection table;
supplying a helium gas into the three-way valve device via the communication part and the third opening in a state wherein the sealed space is formed;
determining whether or not there is a leakage of the helium gas into the sealed space after the helium gas has been supplied into the three-way valve device; and
suctioning and discharging the helium gas supplied into the three-way valve device, via the third opening and the communication part, after it has been determined whether or not there is the leakage of the helium gas into the sealed space;
wherein
the suctioning and discharging the helium gas includes:
causing a compressed air to flow through a compressed-air path; and
communicating a portion of the compressed-air path with the communication part and drawing the helium gas in the three-way valve device into the compressed-air path by using flow of the compressed air as a suction force.

6. The inspection method according to claim 5, further comprising
moving the enclosure to open the sealed space after the suctioning and discharging the helium gas.

7. The inspection method according to claim 6, wherein
the supplying a helium gas includes controlling a helium-gas supply control valve so as to start supplying the helium gas into the three-way valve device via the communication part and the third opening,
the causing a compressed air to flow includes controlling a compressed-air flow control valve so as to start causing the compressed air to flow through the compressed-air path, and
the drawing the helium gas includes controlling a gas draw control valve so as to communicate between the portion of the compressed-air path and the communication part.

8. The inspection method according to claim 7, wherein a movement of the enclosure, a control of the helium-gas supply control valve, a control of the compressed-air flow control valve, and a control of the gas draw control valve are automatically controlled by a control device.

9. An inspection apparatus for inspecting whether or not there is a leakage of a multi-way valve device having at least two openings and a further third opening, the inspection device comprising:
a sealing member configured to hermetically seal each of the at least two openings;
an inspection table configured to support the multi-way valve device in such a state that the at least two openings are sealed by the sealing member;
a communication part provided through the inspection table and configured to hermetically communicate with the third opening in a state wherein the multi-way valve device is supported by the inspection table;
an enclosure configured to cover the multi-way valve device to form a sealed space except for the communication part in the state wherein the multi-way valve device is supported by the inspection table;
a helium-gas supply path for supplying a helium gas into the multi-way valve device via the communication part and the third opening in a state wherein the sealed space is formed by the enclosure;
a leak tester device configured to determine whether or not there is a leakage of the helium gas into the sealed space after the helium gas has been supplied into the multi-way valve device; and
a helium-gas suction discharge path for suctioning and discharging the helium gas supplied into the multi-way valve device, via the third opening and the communication part, after it has been determined whether or not there is the leakage of the helium gas into the sealed space;
wherein
the helium-gas suction discharge path includes:
a compressed-air path through which a compressed air is caused to flow at least after it has been determined whether or not there is the leakage of the helium gas into the sealed space; and
a gas draw path that communicates a portion of the compressed-air path with the communication part, configured to draw the helium gas in the multi-way valve device into the compressed-air path by using flow of the compressed air as a suction force.

* * * * *